United States Patent
Kim et al.

(10) Patent No.: US 11,403,516 B2
(45) Date of Patent: Aug. 2, 2022

(54) APPARATUS AND METHOD FOR PROCESSING CONVOLUTION OPERATION OF NEURAL NETWORK

(71) Applicant: SAMSUNG ELECTRONICS CO., LTD., Suwon-si (KR)

(72) Inventors: Namjoon Kim, Anyang-si (KR); Sehwan Lee, Suwon-si (KR); Junwoo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 16/106,902

(22) Filed: Aug. 21, 2018

(65) Prior Publication Data
US 2019/0138891 A1   May 9, 2019

(30) Foreign Application Priority Data

Nov. 9, 2017  (KR) .................. 10-2017-0148723

(51) Int. Cl.
  *G06N 3/063*  (2006.01)
  *G06N 3/08*  (2006.01)
  *G06N 3/04*  (2006.01)

(52) U.S. Cl.
  CPC .............. *G06N 3/063* (2013.01); *G06N 3/04* (2013.01); *G06N 3/082* (2013.01)

(58) Field of Classification Search
  CPC ........... G06N 3/04; G06N 3/082; G06N 3/063
  See application file for complete search history.

(56) References Cited

U.S. PATENT DOCUMENTS

| | | | |
|---|---|---|---|
| 6,366,936 B1 | 4/2002 | Lee et al. | |
| 7,391,632 B2 | 6/2008 | Kim et al. | |
| 7,634,137 B2 | 12/2009 | Simard et al. | |
| 9,582,726 B2 | 2/2017 | Pan et al. | |
| 2017/0011288 A1* | 1/2017 | Brothers | G06F 9/3017 |
| 2017/0323197 A1* | 11/2017 | Gibson | G06F 7/5443 |
| 2018/0046900 A1* | 2/2018 | Dally | G06N 3/0427 |

(Continued)

FOREIGN PATENT DOCUMENTS

| | | |
|---|---|---|
| KR | 10-1463744 B1 | 11/2014 |
| KR | 10-1722215 B1 | 3/2017 |
| KR | 10-2019-0036896 A | 4/2019 |

OTHER PUBLICATIONS

Kim et al. (ZeNA: Zero-Aware Neural Network Accelerator, Aug. 2017, pp. 39-46) (Year: 2017).*

(Continued)

*Primary Examiner* — George Giroux
(74) *Attorney, Agent, or Firm* — NSIP Law

(57) ABSTRACT

A neural network apparatus includes a plurality of node buffers connected to a node lane and configured to store input node data by a predetermined bit size; a plurality of weight buffers connected to a weight lane and configured to store weights; and one or more processors configured to: generate first and second split data by splitting the input node data by the predetermined bit size, store the first and second split data in the node buffers, output the first split data to an operation circuit for a neural network operation on an index-by-index basis, shift the second split data, and output the second split data to the operation circuit on the index-by-index basis.

16 Claims, 13 Drawing Sheets

(56) References Cited

U.S. PATENT DOCUMENTS

| | | | |
|---|---|---|---|
| 2018/0046906 A1* | 2/2018 | Dally | G06N 3/04 |
| 2018/0218518 A1* | 8/2018 | Yan | G06N 3/063 |
| 2018/0315157 A1* | 11/2018 | Ould-Ahmed-Vall | G06N 3/0454 |
| 2019/0095782 A1 | 3/2019 | Song | |

OTHER PUBLICATIONS

Hubara et al. (Binarized Neural Networks, Mar. 2016, pp. 1-9) (Year: 2016).*
Chen, Yu-Hsin, et al. "Eyeriss: An Energy-Efficient Reconfigurable Accelerator for Deep Convolutional Neural Networks." *IEEE Journal of Solid-State Circuits*, vol. 52, No. 1, Jan. 2017 (pp. 127-138).
Judd, Patrick, et al. "Cnvlutin 2: Ineffectual-Activation-and-Weight-Free Deep Neural Network Computing," arXiv preprint arXiv:1705.00125, Apr. 29, 2017 (pp. 1-6).
Judd, Patrick et al., "Stripes: Bit-Serial Deep Neural Network Computing", *2016 49th Annual IEEE/ACM International Symposium on Microarchitecture (MICRO)*, 2017 (12 pages in English).
Hwang, JongHee, et al., "The Motion Estimator Implementation with Efficient Structure for Full Search Algorithm of Variable Block Size", *Journal of the Institute of Electronics Engineers of Korea SD*, 46.11, 2009 (pp. 66-76).

\* cited by examiner

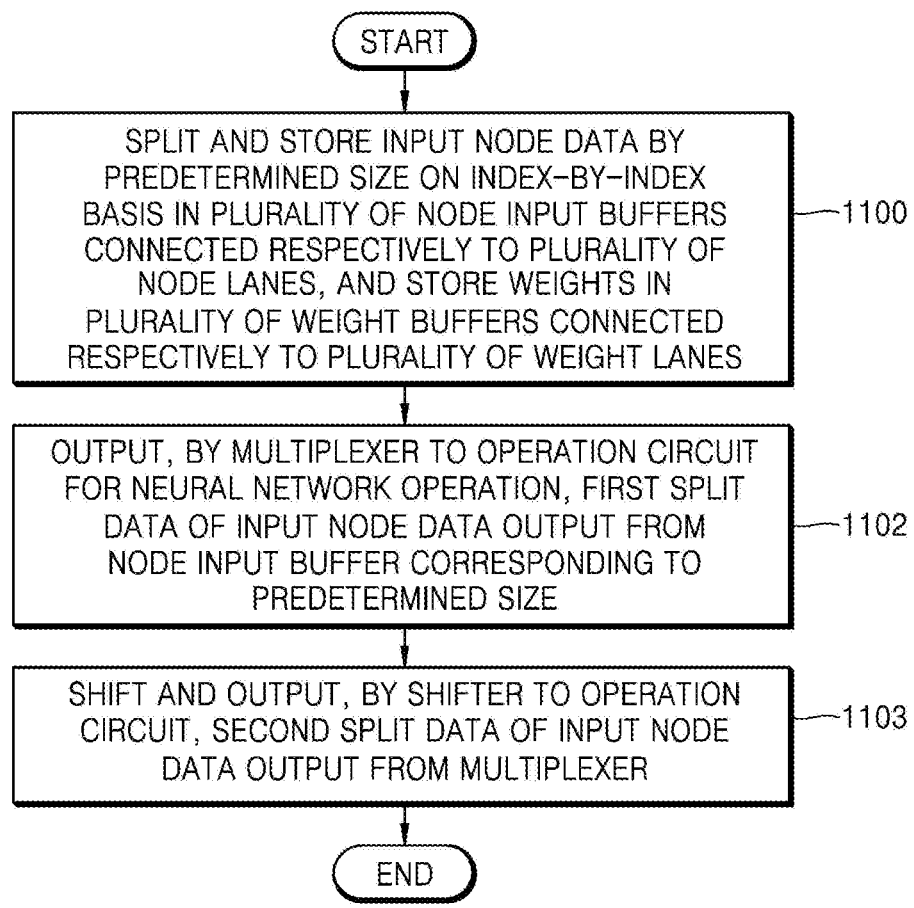

| L/H | | I | II | | III |
|---|---|---|---|---|---|
| | NEURON INPUT DATA | H | L | H | L |
| | WEIGHT | H | H | L | L |

APPARATUS AND METHOD FOR PROCESSING CONVOLUTION OPERATION OF NEURAL NETWORK

CROSS-REFERENCE TO RELATED APPLICATIONS

This application claims the benefit of Korean Patent Application No. 10-2017-0148723, filed on Nov. 9, 2017, in the Korean Intellectual Property Office, the disclosure of which is incorporated herein in its entirety by reference.

BACKGROUND

1. Field

The present disclosure relates to apparatuses and methods with a neural network.

2. Description of Related Art

Technological automation of feature extraction, pattern recognition, and/or analyses, as only examples, has been implemented through processor implemented neural network models, as specialized computational architectures, that after substantial training may provide computationally intuitive feature extractions or recognitions, mappings between input patterns and output patterns, pattern recognitions of input patterns, or categorization in various forms. The trained capability of extracting such information or recognitions, generating such mappings, performing such pattern recognitions, or performing such categorizations may be referred to as a learning capability of the neural network. Such trained capabilities may also enable the specialized computational architecture to classify an input pattern or object(s), or portions of the input pattern or object(s), e.g., as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network apparatus, the apparatus including: a plurality of node buffers connected to a node lane and configured to store input node data by a predetermined bit size; a plurality of weight buffers connected to a weight lane and configured to store weights; and one or more processors configured to: generate first and second split data by splitting the input node data by the predetermined bit size, store the first and second split data in the node buffers, output the first split data to an operation circuit for a neural network operation on an index-by-index basis, shift the second split data, and output the second split data to the operation circuit on the index-by-index basis.

The operation circuit may be configured to respectfully convolute the first split data and the shifted second split data based on and the weights.

The one or more processor may further include: a multiplexer configured to perform the outputting of the first split data to the operation circuit for the neural network operation on the index-by-index basis; and a shifter configured to perform the shifting of the second split data, and perform the outputting of the second split data to the operation circuit on the index-by-index basis.

The one or more processors may be configured to not split and store either one or both of the first and second split data, in response to the either one or both of the first and second split data including all zero values.

The one or more processors may be configured to perform a replacement on the either one or both of the first and second split data using partial data of next input node data having a same index as an index of the input node data.

The input node data may have an N-bit size, N is a natural number, N/D is an integer;

the one or more processors may be configured to split the input node data in units of N/D bits; and N/D is greater than 1.

The one or more processors may be configured to not split and store the input node data except for a least significant bit (LSB) region of N/D bits, in response to N/D being 4 and the input node data having a value of 0 to 15.

The one or more processors may be configured to not split and store a least significant bit (LSB) region of N/D bits of the input node data, in response to the input node data having a value of a multiple of 16.

The one or more processors may be configured to not split and store the input node data, in response to the input node data having a total value of 0.

The one or more processors may be configured to not fetch a region of the input node data including a zero value from a memory, in response to the zero value being included in units of size by which a bit size of the input node data is divided.

In another general aspect, there is provided a neural network apparatus, the apparatus including: a plurality of node buffers connected to a node lane and configured to store input node data by a predetermined bit size; a plurality of weight buffers connected to a weight lane and configured to store weights; and one or more processors configured to: generate first and second split data by splitting the input node data by the predetermined bit size, store the first and second split data in the node buffers, output the weights from the weight buffers, output the first split data from the node buffers on an index-by-index basis, and shift and output the second split data from node the buffers on an index-by-index basis; and an operation circuit configured to convolute the first split data and the shifted second split data output from the node buffers and the weights output from the weight buffers.

The one or more processor may further include: a multiplexer configured to perform the outputting of the first split data from the node buffers on the index-by-index basis; and a shifter configured to perform the shifting and outputting of the second split data from the node buffers on the index-by-index basis.

In another general aspect, there is provided a neural network apparatus, the apparatus including: a preprocessing apparatus configured to split input node data and weights by a predetermined size of at least two or more, store the split input node data and the split weights by the predetermined size, and output the split input node data and the split weights based on symbol data; an operation circuit configured to generate output data by performing a convolution operation on the split input node data and the split weights, and output the generated output data; and a shifter configured to shift the generated output data output from the operation circuit.

The preprocessing apparatus may be configured to: split the input node data into at least first and second input node data, and split the weights into at least a first and second weight; output the first input node data and the first weight based on the symbol data in a first cycle operation; output the second input node data and the first weight based on the symbol data in a second cycle operation; output the first input node data and the second weight based on the symbol data in a third cycle operation; output the second input node data and the second weight based on the symbol data in a fourth cycle operation; and the shifter may be configured to: shift the first input node data and the first weight output in the first cycle operation by twice the predetermined size; shift the second input node data and the first weight output in the second cycle operation by the predetermined size; and shift the first input node data and the second weight output in the third cycle operation by the predetermined size.

The predetermined size of input node data may be N bits (N is a natural number greater than or equal to 2), the first input node data and the first weight may be most significant bit (MSB) N/2 bits and the second input node data and the second weight may be least significant bit (LSB) N/2 bits.

In another general aspect, there is provided a method for neural network operation, the method including: splitting and storing input node data into first and second split data and storing the first and second split data by a predetermined size on an index-by-index basis in a plurality of node input buffers connected respectively to a plurality of node lanes; storing weights in a plurality of weight buffers connected respectively to a plurality of weight lanes; outputting, by a multiplexer to an operation circuit for the neural network operation, the first split data; and shifting and outputting, by a shifter to the operation circuit, the second split data.

The method may further include not splitting and storing either one or both of the first and second split data, in response to the either one or both of the first and second split data including all zero values.

The method may further include performing a replacement on the either one or both of the first and second split data using partial data of next input node data having a same index as an index of the input node data.

The method may further include splitting the input node data in units of N/D bits, wherein the input node data has an N-bit size, N is a natural number, N/D is an integer, and D increases until a value of N/D becomes 1.

The method may further include not splitting and storing the input node data except for a least significant bit (LSB) region of N/D bits, in response to N/D being 4 and the input node data having a value of 0 to 15.

The method may further include not splitting and storing a least significant bit (LSB) region of N/D bits of the input node data, in response to the input node data having a value of a multiple of 16.

The method may further include not splitting and storing the input node data, in response to the input node data having a total value of 0.

The method may further include not fetching a region of the input node data including a zero value from a memory, in response to the zero value being included in units of size by which a bit size of the input node data is divided.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which:

FIG. 11 is a flowchart illustrating a preprocessing method for a convolution operation according to an embodiment;

DETAILED DESCRIPTION

Figure 1:
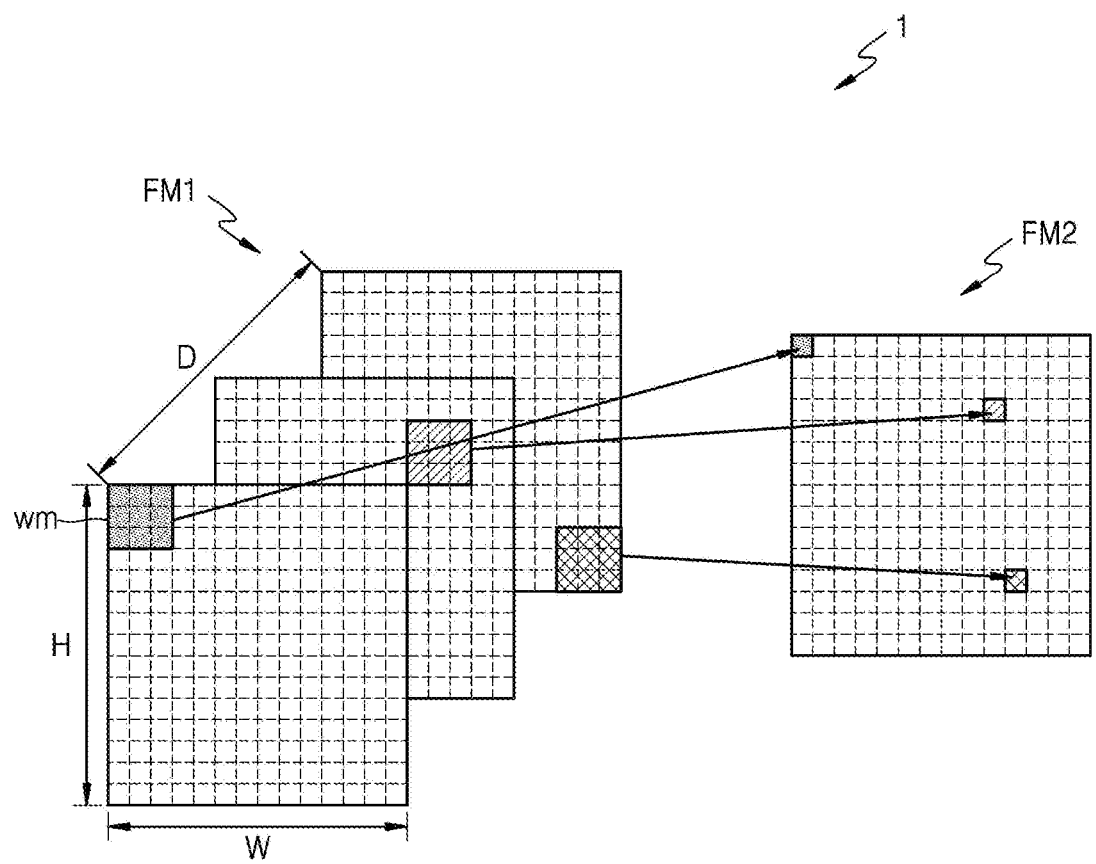
FIG. 1 is a diagram illustrating an architecture of a computational graph according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As the terms used herein, so far as possible, widely-used general terms are selected in consideration of functions in the present embodiments; however, these terms may vary after an understanding of the disclosure of this application, the precedents, or the appearance of new technology. Also, in some cases, there may be terms that are optionally selected, and the meanings thereof will be described in detail in the corresponding portions of the description of the embodiment. Thus, the terms used herein are not simple terms and should be defined based on the meanings thereof and the overall description of the present embodiments.

In the descriptions of the embodiments, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

The term such as "comprise" or "include" used herein should not be construed as necessarily including all of the elements or operations (or steps) described herein, and should be construed as not including some of the described elements or operations (or steps) or as further including additional elements or operations (or steps in varying embodiments).

The following description of embodiments should not be construed as limiting the scope of the present disclosure, and those that may be inferred after an understanding of the disclosure of this application should be construed as being included in the scope of the embodiments. Hereinafter, embodiments will be described in detail merely as examples with reference to the accompanying drawings.

FIG. 1 is a diagram illustrating an architecture of a computational graph according to an embodiment.

Thus, as illustrated in FIG. 1, a computational graph 1 represents a mathematical model by using nodes and edges. The architecture of the computational graph 1 may correspond to the architecture of a neural network, but various other models may be represented. Herein, the neural network may be the architecture of a deep neural network (DNN) or an n-layer neural network. The DNN or the n-layer neural network may correspond to, for example, convolutional neural networks (CNN), recurrent neural networks (RNN), deep belief networks, or restricted Boltzman machines. For example, the neural network may be implemented as a convolutional neural network (CNN); however, the present disclosure is not limited thereto. When the computational graph 1 of FIG. 1 represents a convolutional neural network, the computational graph 1 may correspond to some layers of the convolutional neural network. Thus, the computational graph 1 may correspond to a convolutional layer, a pooling layer, and/or a fully connected layer of the convolutional neural network. For the sake of convenience, the following description will be made assuming that the computational graph 1 corresponds to the convolutional layer of the convolutional neural network; however, the present disclosure is not limited thereto and the computational graph 1 may correspond to the representation of other mathematical models.

For example, in the present disclosure, apparatuses may be described as implementing the example CNNs, e.g., based on convolutions using previously trained parameters and/or convolutions or convolution operations that are selectively performed based on such previously trained parameters, though embodiments are not limited to such apparatuses only performing such convolutional and/or selective convolutional operations, but rather embodiments also include such apparatuses also being configured to train the example CNN as described below, as well as or also use the trained CNN and/or selectively implemented CNN in an example, filtering, detection, recognition, rejection, verification, classification, or other such 'interpretative' operations or objectives the respective layers or overall CNN are trained to perform. Herein, it is also noted that use of the term 'may' with respect to an example or embodiment, e.g., as to what an example or embodiment may include or implement, means that at least one example or embodiment exists where such a feature is included or implemented while all examples and embodiments are not limited thereto.

Figure 2:
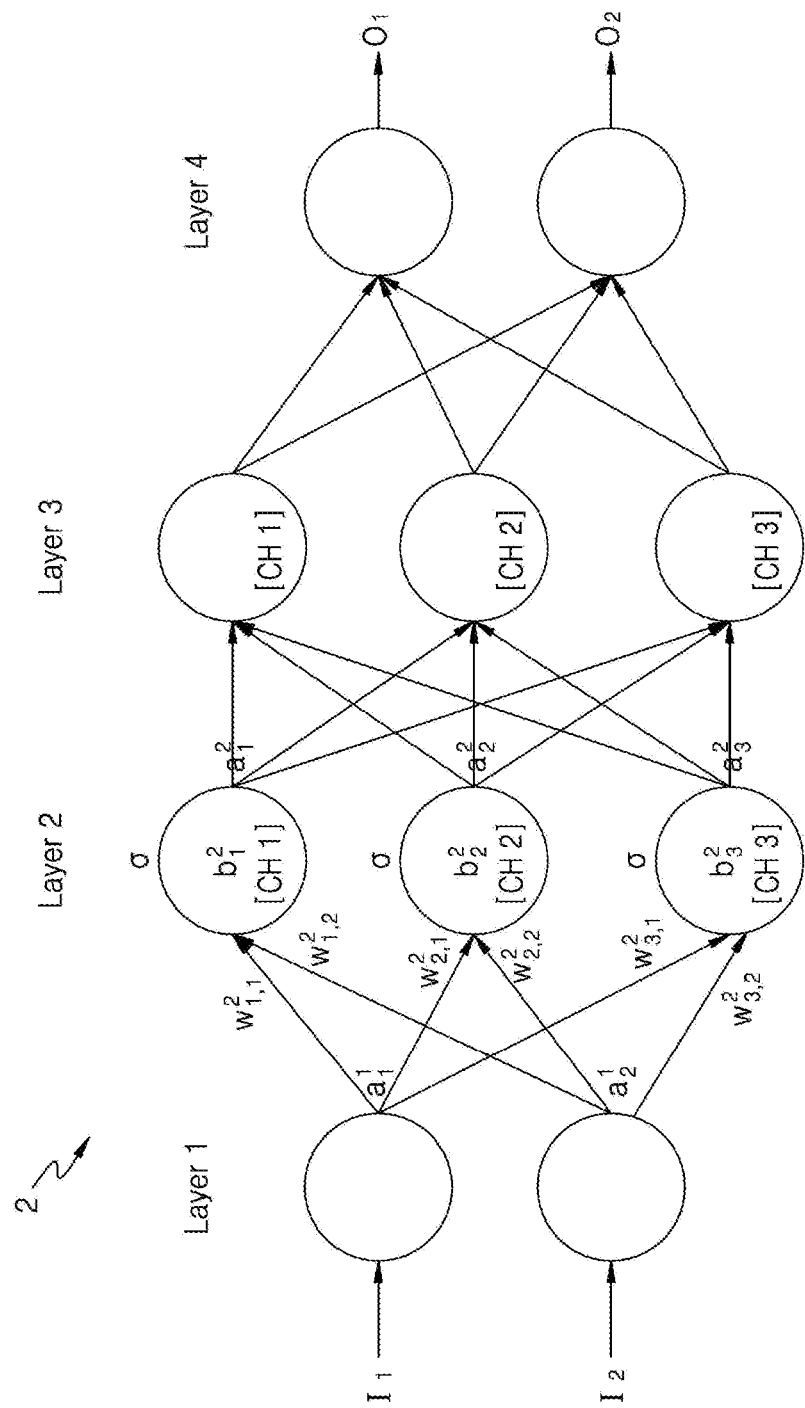
FIG. 2 is a diagram illustrating an operation performed in a neural network according to an embodiment.

Referring to FIGS. 1 and 2, a neural network apparatus may train and/or acquire trained parameters corresponding to one or more layers included in a neural network, e.g., the herein discussed example CNN type of neural network, noting that embodiments are not limited thereto. For example, the neural network apparatus may acquire parameters, e.g., as determined by the neural network apparatus during the training of the neural network by the neural network apparatus, from memory, or through external request or provision. Additionally, the neural network apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The neural network apparatus may also be provided or made available the kernel, kernel element, and/or other connection weight vectors, matrix or matrices, or other format kernels, kernel elements, and/or connection weights, as a result of training of the neural network by the neural network apparatus or by another processing apparatus or server, for example. The neural network apparatus is representative of one or more processors and one or more non-transitory memories, for example, such as to store such parameters, for use during and after the convolutional and/or selective convolutional operations of the neural network, and for storing of instructions, which when executed by the one or more processors, cause the one or more processors to implement one or more or all operations described herein, for example.

With respect to FIGS. 1 and 2, the respective neural networks include a plurality of layers, and each of the layers includes a plurality of nodes. For example, there may be an input layer, at least one hidden layer, and an output layer. Depending on the architecture of the neural network, nodes included in neighboring layers may be selectively connected according to respective connections, e.g., which may or may not be weighted. For example, the neural network may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed filtering, detection, recognition, verification, or rejection, such as image recognition or verification, translation or rejection, or input data binary or multi-class classification, clustering, pattern observation, transformation, and/or regression, as well as any other trained objective of the neural network. Thus, as a non-limiting examples, in varying embodiments, the neural network may be trained for image or object detection, recognition, identification, rejection, or discrimination. Thus, based on the training data and desired interpretation objective, the architecture, selective connections between neighboring nodes and/or kernels, kernel elements, or other connections within layers may be varied during training by the neural network apparatus until the neural network is trained to a desired acceptability for the desired interpretation objective. For example, in examples where the neural network is trained for image or object filtering, detection, recognition, verification, or rejection, the neural network may include convolutional layers or be representative of a CNN, and thus the respective convolutional kernel elements, e.g., for varying feature extractions through feature kernels, may be trained to an original desired acceptability for the image or object filtering, detection, recognition, verification, or rejection operations. The neural network may also be of a different type of neural network and merely include one or more convolutional layers, e.g., for selective feature extraction, for other objectives. Thus, herein, though embodiments may be discussed from the perspective of a neural network apparatus, such reference to CNNs is not intended to be limiting of the apparatus to only implementing CNNs or even to implement CNNs. Returning to the training of the neural network, the resultant kernels, kernel elements, and/or other connection weights of the trained neuro network may be referred to as parameters of the neural network, e.g., demonstrated as at least trained kernel elements of a convolutional layer or operation of the CNN. For example, the neural networks may be respectively trained based on the labeled input image information or desired corresponding output images, filtering, classifications, or geometric parameters, such as through a backpropagation algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neuro network may be stored in a memory of the training and/or recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, gated linear unit nodes, or merely nodes configured to perform a single activation function for a summation of inputs, and define any or any further recurrent structures of the neural network, which may vary depending on embodiment and interpretation objective of the trained neural network.

Thus, in the convolution layer illustrated in FIG. 1, a first feature map FM1 may correspond to an input feature map and a second feature map FM2 may correspond to an output feature map. The feature map may refer to a data set representing various features of the input data. The feature maps FM1 and FM2 may be two-dimensional or higher-dimensional matrixes and may have respective activation parameters. For example, when the feature maps FM1 and FM2 correspond to three-dimensional feature maps, the feature maps FM1 and FM2 may have a width W (or a column), a height H (or a row), and a depth D. In this case, the depth D may be referred to as the number of channels.

In the convolution layer, a convolution operation may be performed on the first feature map FM1 and a weight map WM, and as a result, the second feature map FM2 may be generated. The weight map WM may filter the first feature map FM1 and may be referred to as a filter or kernel. The depth of the weight map WM, that is, the number of channels of the weight map WM, may be equal to a value obtained by multiplying the depth of the first feature map FM1 by the depth of the second feature map FM2, that is, a value obtained by multiplying the number of channels of the first feature map FM1 by the number of channels of the second feature map FM2. For example, when training the convolution layer, for known or desired dimensions for input first feature map FM1 and known or desired dimensions for the output second feature map FM2, the dimensions of the weight map WM may be determined and then trained. Then during inference operations, when the input first feature map FM1 is input to the convolution layer and convoluted (convolved) with the trained weight map WM, the output second feature map FM2 is generated with such known or desired dimensions. Thus, due to the how the convolution operation is performed, there is a correspondence between the dimensions of the first and second feature maps FM1, FM2 and the dimensions of the weight map WM. Additionally, when the weight map WM is a four-dimensional matrix and the kernel size is k, the number of channels of the weight map WM may be calculated or predetermined as "(Depth of First Feature Map FM1)*(Depth of Second Feature Nap FM2)*k*k". In the convolution operation, the weight map WM is shifted in such a manner that the first input feature map FM1 is traversed by the weight map WM as a sliding window. For each shift, each of the weights included in the weight map WM may be multiplied and added (or accumulated) with all feature values in an overlapping region with the first feature map FM1. This multiplication and adding operation may also be referred to as a MAC operation. As the first feature map FM1 and the weight map WM are convoluted (convolved) together, one channel of the second feature map FM2 may be generated. Although one weight map WM is illustrated in FIG. 1, a plurality of weight maps may be convoluted with the first feature map FM1 to respectively generate a plurality of channels of the second feature map FM2 in a similar manner.

On the other hand, the second feature map FM2 of the convolution layer may be an input feature map of the next layer. For example, the second feature map FM2 may be an input feature map of the pooling layer.

FIG. 2 is a diagram illustrating an operation performed in a neural network according to one or more embodiments.

Thus, as illustrated in FIG. 2 and as noted above, a neural network 2 may have a structure or architecture including an input layer, hidden layers, and an output layer, and may perform an operation based on the received input data (e.g., $I_1$ and $I_2$) and generate output data (e.g., $O_1$ and $O_2$) based on the operation performance result.

The neural network 2 may be a DNN or an n-layer neural network including two or more hidden layers, as described above. For example, as illustrated in FIG. 2, the neural network 2 may be a DNN including an input layer (Layer 1), two hidden layers (Layer 2 and Layer 3), and an output layer (Layer 4). When the neural network 2 is implemented in a DNN architecture, since the neural network 2 includes more layers capable of processing valid information than a neural network having a single hidden layer, the neural network 2 may process more complex data sets than the neural network having the single hidden layer. Although the neural network 2 is illustrated as including four layers, this is merely an example and the neural network 2 may include less or more layers or may include less or more channels. E.g., the neural network 2 may include an input layer, three or more hidden layers, and an output layer. That is, the neural network 2 may include layers of various structures different from those illustrated in FIG. 2.

Each of the layers included in the neural network 2 may include a plurality of channels. The channel may correspond to a plurality of nodes known as processing elements (PEs), units, or similar terms. The nodes may also be referred to as artificial neurons though such reference is not intended to impart any relatedness with respect to how the neural network architecture computationally maps or thereby intuitively recognizes information and how a human's neurons operate, i.e., the term artificial neuron is merely a term of art referring to the hardware implemented nodes of a neural network. For example, as illustrated in FIG. 2, Layer 1 may include two channels (nodes), and each of Layer 2 and Layer 3 may include three channels. However, this is merely an example, and each of the layers included in the neural network 2 may include various numbers of channels (nodes). Briefly, it is noted that though the same channel term is used here with respect to nodes as used above with respect to feature maps of a connected layer, such use of the same term is not intended to mean that they have the same meaning.

The channels included in different layers of the neural network 2 may be connected or linked to each other to process data. For example, one channel in a layer may receive and operate data from other channels in another layer and output the operation result to other channels in yet another layer. Additionally, in a recurrent connection example, one node in a layer may receive data from itself, and/or from another node of the layer, from a previous time. The number of the connections may correspond to the number of the nodes included in the subsequent layer. For example, in adjacent fully connected layers, each node of a current layer may have a respective connection to each node of the subsequent layer, noting that in some examples such full connections may later be pruned or minimized during training or optimization.

Each of the input and output of each of the channels may be referred to as an input activation and an output activation, or a value which results from such a predetermined activation function of the corresponding node. That is, the activation may thus be an output of one channel and, due to corresponding connection(s) with a next layer, a parameter corresponding to the input of the channels included in the next layer. Meanwhile, each of the channels may determine its own activation based on the resultant activations and weights received from the channels included in the previous layer. The weight may be a parameter used to calculate the output activation in each channel and may be a value allocated to the connection relationship between the channels. For example, an output from a previous layer's node may be provided to as an input to a node of a next or subsequent layer through a weighted connection between the previous layer's node and the node of the next layer, with the weight of the weighted connection being variously adjusted during the training of the neural network until the neural network is trained for a desired objective. There may be additional connections to the node of the next layer, such as for providing a bias connection value through a connection that may or may not be weighted and/or for providing the above example recurrent connection which may be weighted. During training and implementation such connections and connection weights may be selectively implemented, removed, and varied to generate or obtain a resultant neural network that is thereby trained and that may be correspondingly implemented for the trained objective, such as for any of the above example recognition objectives.

Accordingly, returning to FIG. 2, each of the channels may be processed by a computational unit or a processing element that receives an input, e.g., through such weighted connections, and outputs an output activation, and thereby the input-output of each of the channels may be mapped. The computational unit may correspond to the activation function for a node. As a non-limiting example, when σ is an activation function, $w_{jk}^{i}$ is a weight for the connection between the kth channel included in the (i−1)th layer and the jth channel included in the ith layer, $b_j^i$ is a bias of the jth channel included in the ith layer, and $a_j^i$ is a resultant activation of the jth channel of the ith layer, the activation $a_j^i$ may be calculated by using Equation 1 below.

$$a_j^i = \sigma\left(\sum_k (w_{jk}^i \times a_k^{i-1}) + b_j^i\right) \quad \text{Equation 1}$$

As illustrated in FIG. 2, the activation of the first channel (CH 1) of the second layer (Layer 2) may be represented as $a_1^2$. Also, $a_1^2$ may have a value of $a_1^2 = \sigma(w_{1,1}^2 \times a_1^1 + w_{1,2}^2 \times a_2^1 + b_1^2)$ according to Equation 1. However, Equation 1 is merely an example for illustrating the activation and the weight used to process data in the neural network 2, and the present disclosure is not limited thereto. The activation may be a value obtained by passing a value obtained by applying an activation function to the sum of the activations received from the previous layer through a rectified linear unit (ReLU).

As described above, in the neural network 2, a large number of data sets are exchanged between a plurality of interconnected channels, and a number of operations are performed through the layers. Thus, technology that may minimize the loss of accuracy while reducing the amount of computation required to process complex input data may be desirable.

Figure 3:
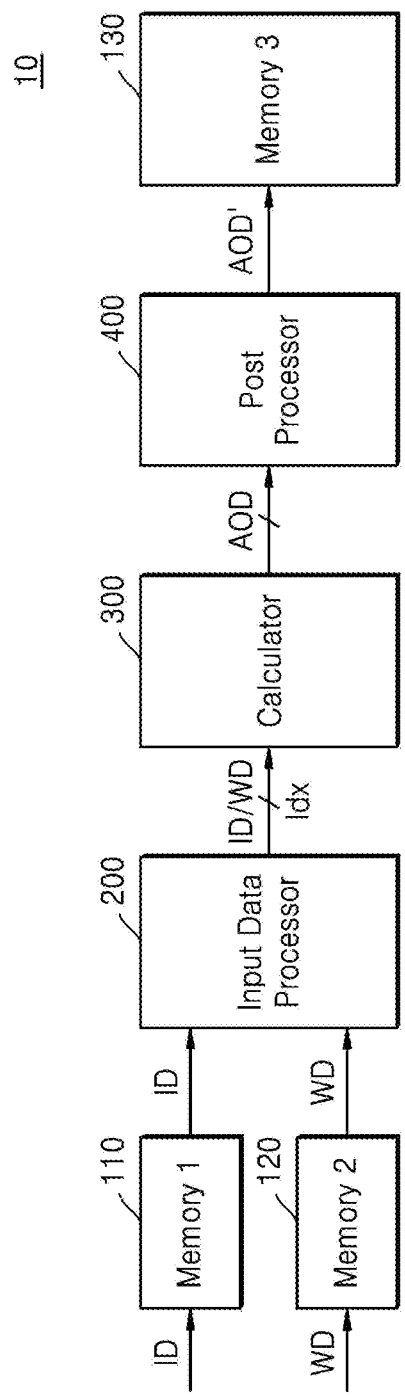
FIG. 3 is a schematic block diagram illustrating a convolution operation apparatus according to an embodiment.

FIG. 3 is a schematic block diagram illustrating a convolution operation apparatus 10 according to an embodiment.

Thus, as illustrated in FIG. 3, the convolution operation apparatus 10 may include a first memory 110, a second memory 120, a third memory 130, an input data processor 200, a calculator 300, and a post processor 400. The convolution operation apparatus 10 may receive two pieces of data and perform a convolution operation on both pieces of data. In an embodiment, the convolution operation apparatus 10 may receive input data ID used in a convolution neural network (CNN) or input node data (e.g., image data of an input layer of the convolution neural network or feature data resulting from a previous layer of the convolutional neural network) and weight data WD (e.g., filter or kernel data used in the convolutional neural network) and perform a convolution operation on the input data ID and the weight data WD to generate accumulation output data AOD. Below, reference will be made with respect to convolution operations with respect to the input data ID for explanatory purposes, noting that such discussions are similarly applicable to input node data.

The first memory 110 may store the input data ID, and the second memory 120 may store the weight data WD. Also, the third memory 130 may store the accumulation output data AOD that is the result of the convolution operation on the input data ID and the weight data WD, or may store the accumulation output data AOD' resulting from the post processor 400 operating on the AOD generated by the calculator 300. Each of the first memory 110, the second memory 120, and the third memory 130 may include a volatile memory device such as a dynamic random access memory (DRAM) (e.g., Double Data Rate Synchronous Dynamic Random Access Memory (DDR SDRAM), Low Power Double Data Rate (LPDDR) SDRAM, Graphics Double Data Rate (GDDR) SDRAM, or Rambus Dynamic Random Access Memory (RDRAM)), a static random access memory (SRAM), a latch, a flip-flop, or a register and may include a nonvolatile memory device such as a NAND flash memory, a vertical NAND flash memory (VNAND), a NOR flash memory, a resistive RAM (RRAM), a phase change memory (PRAM), a magnetoresistive memory (MRAM), a ferroelectric memory (FRAM), or a spin-transfer torque RAM (STT-RAM). Herein, the first memory 110, the second memory 120, and the third memory 130 are described as a static random access memory (SRAM); however, examples of the present disclosure is not limited thereto.

In FIG. 3, the first memory 110, the second memory 120, and the third memory 130 are illustrated as separate blocks; however, this is merely an embodiment and any one or any combination of any two or more of the first memory 110, the second memory 120, and the third memory 130 may be configured as one physical memory in another embodiment. Also, in FIG. 3, the first memory 110, the second memory 120, and the third memory 130 are illustrated as being included in the convolution operation apparatus 10; however, this is merely an embodiment and such an example of a technical concept of the present disclosure may also be applied to a case where the first memory 110, the second memory 120, and the third memory 130 are configured as a memory included outside the convolution operation apparatus 10.

The input data processor 200 may receive the input data ID and the weight data WD and calculate an index Idx based on the received input data ID and weight data WD. In an embodiment, the input data processor 200 may calculate the index Idx based on a data address of the output data corresponding to the input data ID, and the index Idx may correspond to the input data ID and the data address of the output data corresponding thereto. As an example, the data address may represent the position that the input data processed by the input data processor 200 occupies in the data relative to positions of other data comprised in the data. The input data processor 200 may transmit the input data ID and the weight data WD to the calculator 300 together with the index Idx corresponding thereto.

In an embodiment, the input data processor 200 may also generate validity data (e.g., validity) indicating whether an operation is to be performed on the input data ID and the weight data WD, and output the generated validity data to the calculator 300. As an example, the validity data may indicate whether either one or both of the input data ID and the weight data WD is '0', and the calculator 300 may perform an operation based on the validity data in response to neither of the input data ID and the weight data WD being '0'. In this manner, unnecessary convolutional operations of zero value operands may be skipped, or not performed.

The calculator 300 may perform a multiply-accumulation operation on the input data ID and the weight data WD. As an example, the calculator 300 may function as a multiply-accumulation calculator (MAC). According to an example technical concept of the present disclosure, the calculator 300 may multiply the input data ID by the weight data WD and generate accumulation output data AOD by performing an accumulation sum on the multiplication result values based on the index Idx. The calculator 300 may output the generated accumulation output data AOD to the post processor 400. Also, according to an example technical concept of the present disclosure, the calculator 300 may have a butterfly structure. The post processor 400 may perform a post-process on the accumulation output data AOD and store the result thereof in the third memory 130.

According to an example technical concept of the present disclosure, since the calculator 300 performs the accumulation sum based on the index Idx, the input data processor 200 may simultaneously process, e.g., in parallel, the input data ID corresponding to a plurality of indexes Idx without the need for a separate index (Idx) alignment before the calculator input, thus increasing the operation processing speed thereof. Also, since the calculator 300 may have a butterfly structure and perform the accumulation sum based on the index Idx, the number of adders necessary for the accumulation sum operation may be reduced, thus increasing the operation processing speed thereof over previous convolution approaches.

Herein, the above discussed input data processor 200, calculator 300, and post processor 400 may each be representative of respective one or more processors, representative of being implemented by a same one or more processors, or representative of the corresponding operations being respectively implemented in various combinations by two or more processors. For example, each such one or more processors may be implemented through hardware only, e.g., through specialized circuitry, or through a combination of such hardware and instructions, such that when a corresponding processor executes such instructions, the processor is caused to perform the described operations. Thus examples, exist where each of the input data processor 200, calculator 300, and post processor 400 are implemented through hardware only, and examples exist where each of the input data processor 200, calculator 300, and post processor 400 are implemented through the combination of hardware and instructions. Also, in an example, less than all of input data processor 200, calculator 300, and post processor 400 may be implemented through the example combination of hardware and instructions, with the remaining input data processor 200, calculator 300, or post processor 400 being implemented by hardware alone. Thus, as described herein, one or more processors configured to implement or perform the respective operations of the input data processor 200, calculator 300, and post processor 400 is inclusive of all such examples of such hardware and/or hardware/instruction implementations.

Figure 4:
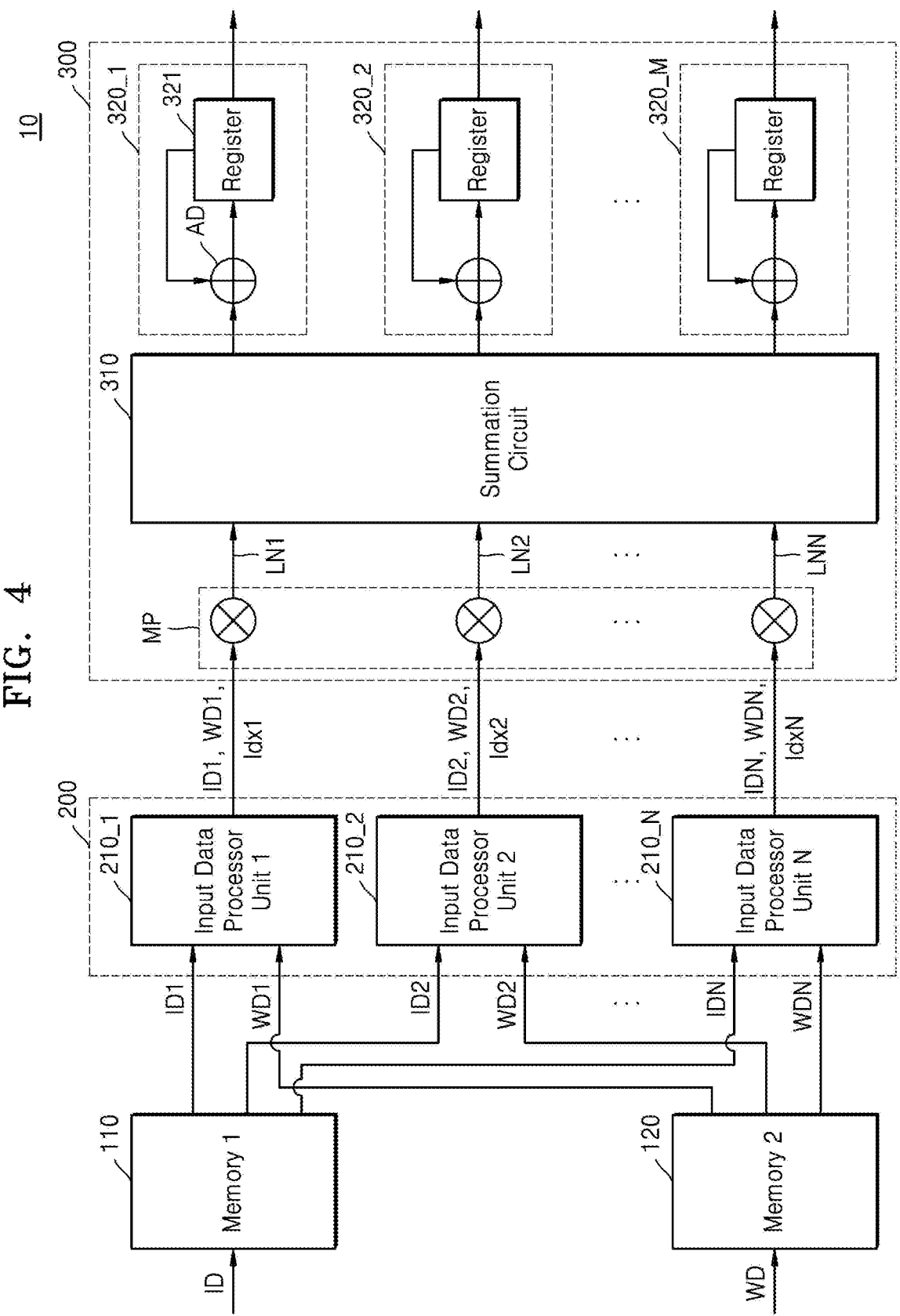
FIG. 4 is a detailed block diagram illustrating a convolution operation apparatus according to an embodiment.

FIG. 4 is a detailed block diagram illustrating a convolution operation apparatus. For explanatory purposes, the convolution operation apparatus of FIG. 4 will be discussed with reference to the convolution operation apparatus 10 of FIG. 3, noting the embodiments are not limited thereto.

Accordingly, FIG. 4 illustrates the first memory 110, the second memory 120, the input data processor 200, and the calculator 300 of the convolution operation apparatus 10. Redundant descriptions already given with reference to FIG. 3 will be omitted for conciseness.

Thus, as illustrated in FIGS. 3 and 4, the convolution operation apparatus 10 may include a first memory 110, a second memory 120, an input data processor 200, and a calculator 300, and the input data processor 200 may include first to Nth input data processor units 210_1 to 210_N.

The first to Nth input data processor units 210_1 to 210_N may respectively receive first to Nth pieces of input data ID1 to IDN from the first memory 110 and first to Nth pieces of weight data WD1 to WDN from the second memory 120. The first to Nth input data processor units 210_1 to 210_N may respectively generate first to Nth indexes Idx1 to IdxN based on data addresses of the first to Nth input data ID1 to IDN and output the generated first to Nth indexes Idx1 to IdxN to the calculator 300 independently together with the first to Nth input data ID1 to IDN and the first to Nth weight data WD1 to WDN. As an example, the data address may represent the position that the input data processed by each of the first to Nth input data processor units 210_1 to 210_N occupies in the entire data.

The calculator 300 may include a plurality of multipliers MP, a summation circuit 310, and first to Mth accumulation circuits 320_1 to 320_M. The plurality of multipliers MP may respectively generate lane data by multiplying the first to Nth input data ID1 to IDN and the first to Nth weight data WD1 to WDN received from the first to Nth input data processor units 210_1 to 210_N. The lane data may be respectively input to the summation circuit 310 through first to Nth lanes LN1 to LNN. The lane data may correspond respectively to the first to Nth indexes Idx1 to IdxN because they are values obtained by multiplying the first to Nth input data ID1 to IDN by the first to Nth weight data WD1 to WDN. In this specification, the lane data may refer to the values obtained by multiplying the input data ID1 to IDN by the weight data WD1 to WDN, respectively. That is, the first lane data may be a constant obtained by multiplying the first input data LD1 and the first weight data WD1 received through the first lane LN1.

The summation circuit 310 may be connected to the first to Nth lanes LN1 to LNN connected respectively to the multipliers MP and the first to Nth input data processor units 210_1 to 210_N corresponding thereto, and the lane data may be received respectively through the first to Nth lanes LN1 to LNN. The summation circuit 310 may compare and add the lane data and the respective corresponding indexes Idx1 to IdxN and sort the lane data, which is generated by being sorted and summed on an index-by-index basis, by data addresses. The summation circuit 310 may output M pieces of output data (M is a natural number greater than or equal to 1) generated by the sorting to the first to Mth accumulation circuits 320_1 to 320_M.

Each of the first to Mth accumulation circuits 320_1 to 320_M may include an adder AD and a register 321. The adder AD may receive accumulation output data from the register 321 and add the output data received from the summation circuit 310 to the accumulation output data. The adder AD may store the accumulation output data obtained by adding the received output data thereto in the register 321. The register 321 may store the accumulation output data and output the stored accumulation output data to the post processor 400.

Figure 5:
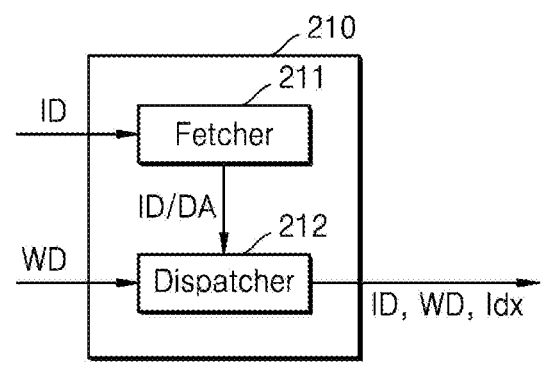
FIG. 5 is a schematic diagram of an input data processor according to an embodiment.

FIG. 5 is a schematic diagram of an input data processor unit. For explanatory purposes, the input data processor unit of FIG. 5 will be discussed with reference to the input data processor unit 210 of FIG. 4, noting the embodiments are not limited thereto.

Thus, as illustrated in FIG. 5, the input data processor unit 210 may include a fetcher 211 and a dispatcher 212. The fetcher 211 may receive the input data ID from the first memory 110 and generate a data address DA based thereon. The fetcher 211 may output the input data ID and the data address DA generated based thereon to the dispatcher 212. The dispatcher 212 may further receive the weight data WD from the second memory 120 and generate an index Idx based on the data address DA. The index Idx may correspond to the data address DA. The dispatcher 212 may output the input data ID and the weight data WD to the calculator 300 together with the generated index Idx.

In an embodiment, the dispatcher 212 may further generate validity data. The validity data may indicate whether an operation is to be performed on the input data ID and the weight data WD, and as an example, the validity data may indicate whether a value or values among either one or both of the input data ID and the weight data WD is '0'. As an example, the dispatcher 212 may output '0' as the validity data when either one or both of the input data ID and the weight data WD has '0' as a data value, and may output '1' as the validity data when both of the input data ID and the weight data WD are not '0'. As another example, the dispatcher 212 may output '1' as the validity data when either one or both of the input data ID and the weight data WD has '0' as a data value, and may output '0' as the validity data when both of the input data ID and the weight data WD are not '0'.

Figure 6:
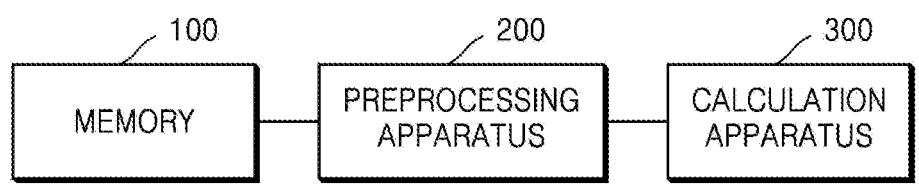
FIG. 6 is a schematic diagram illustrating a convolution operation apparatus according to an embodiment.

FIG. 6 is a schematic diagram illustrating a convolution operation apparatus according to an embodiment.

Thus, as illustrated in FIG. 6, the convolution operation apparatus may include a memory 100, a preprocessing apparatus 200, and a calculation apparatus 300. The memory 100 may correspond to the memories 110 to 130 illustrated in FIG. 3, and the calculation apparatus 300 may correspond to the calculator 300, the MAC or calculator 300, and the post processor 400 illustrated in FIG. 3, noting that embodiments are not limited thereto. In an embodiment, the preprocessing apparatus 200 may correspond to the input data processor 200 illustrated in FIG. 3, also noting that embodiments are not limited thereto.

The preprocessing apparatus 200 according to an embodiment may include node input buffers, weight buffers, a multiplexer, and a shifter. The preprocessing apparatus 200 may correspond to the input data processor 200 illustrated in FIG. 3, particularly to the dispatcher 212 illustrated in FIG. 5. The preprocessing apparatus 200 may include: a plurality of node input buffers connected respectively to a plurality of node lanes and configured to split and store input node data by a predetermined size and output the input node data on an index-by-index basis; a plurality of weight buffers connected respectively to a plurality of weight lanes and configured to store and output weights; a multiplexer configured to output, to an operation circuit for a neural network operation, first split data of the input node data output from the node input buffer corresponding to the predetermined size; and a shifter configured to shift and output, to the operation circuit, second split data of the input node data output from the multiplexer.

According to an embodiment, in the preprocessing apparatus 200, since an input buffer stage for node input data such as feature maps and weights is implemented in a decoupling structure, partial output values for input nodes having various output indexes may be summed by the MAC without a stall.

The preprocessing apparatus 200 according to such an embodiment may split the input node data in units of N/D bits when the input node data has an N-bit size. Herein, N is a natural number and D is a divider for dividing the value of N, wherein D may increase until the value of N/D becomes 1, and N/D may be an integer. The preprocessing apparatus 200 may split the input node data by a size such as ½, ⅓, or ¼, store the results in the input node buffer, and output the same in accordance with different output indexes. For example, in a 16-bit MAC structure, when 16-bit input node data and weights are split and stored by 8 bits on the input buffer and then output to the MAC, the double efficiency may be obtained. Thus, through the preprocessing apparatus according to such an embodiment, the MAC structure may efficiently process an input having various precisions or dynamic fixed points according to the convolution layers.

Figure 7:
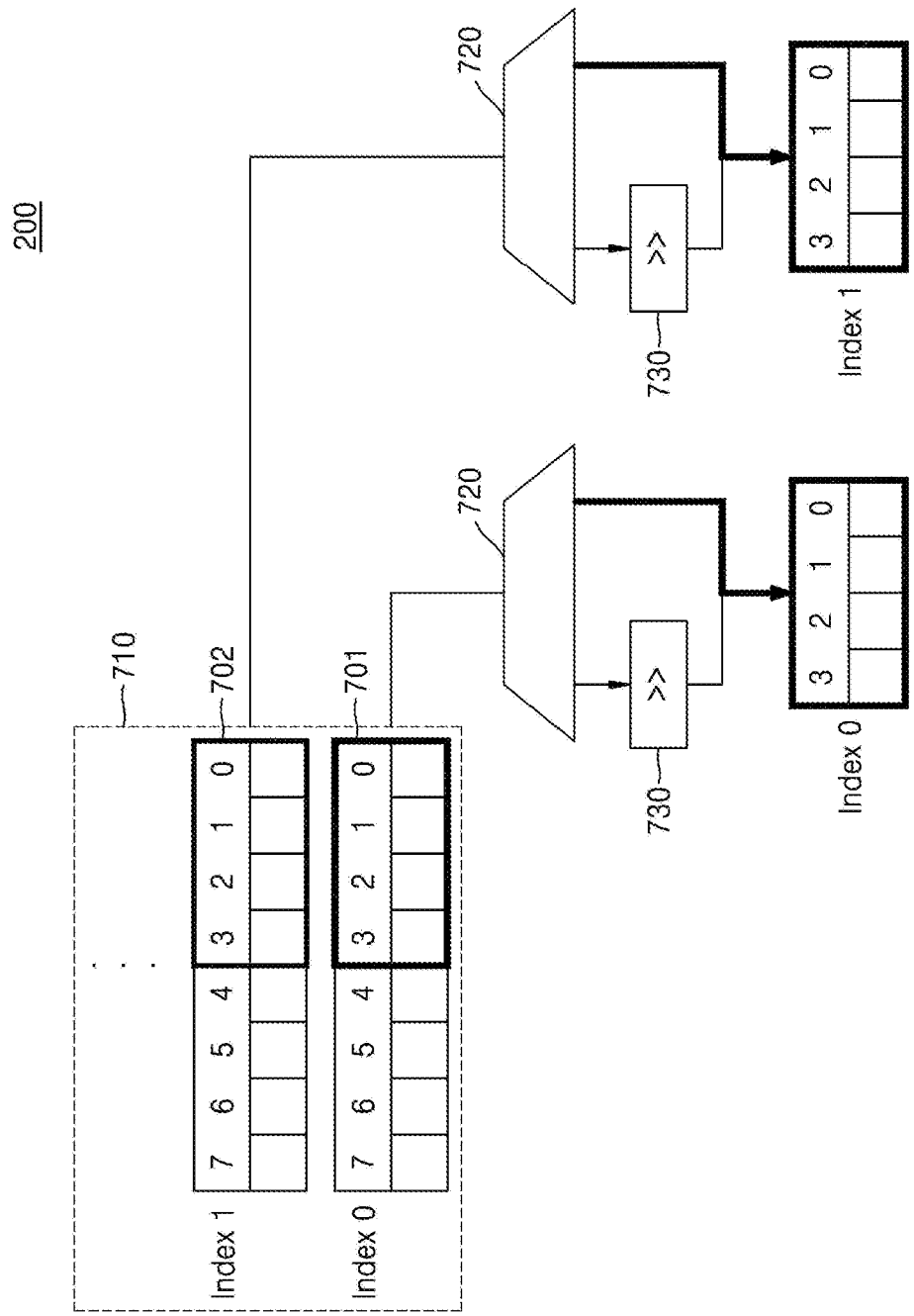
FIGS. 7 and 8 are schematic block diagrams of a preprocessing apparatus according to an embodiment.
Figure 8:
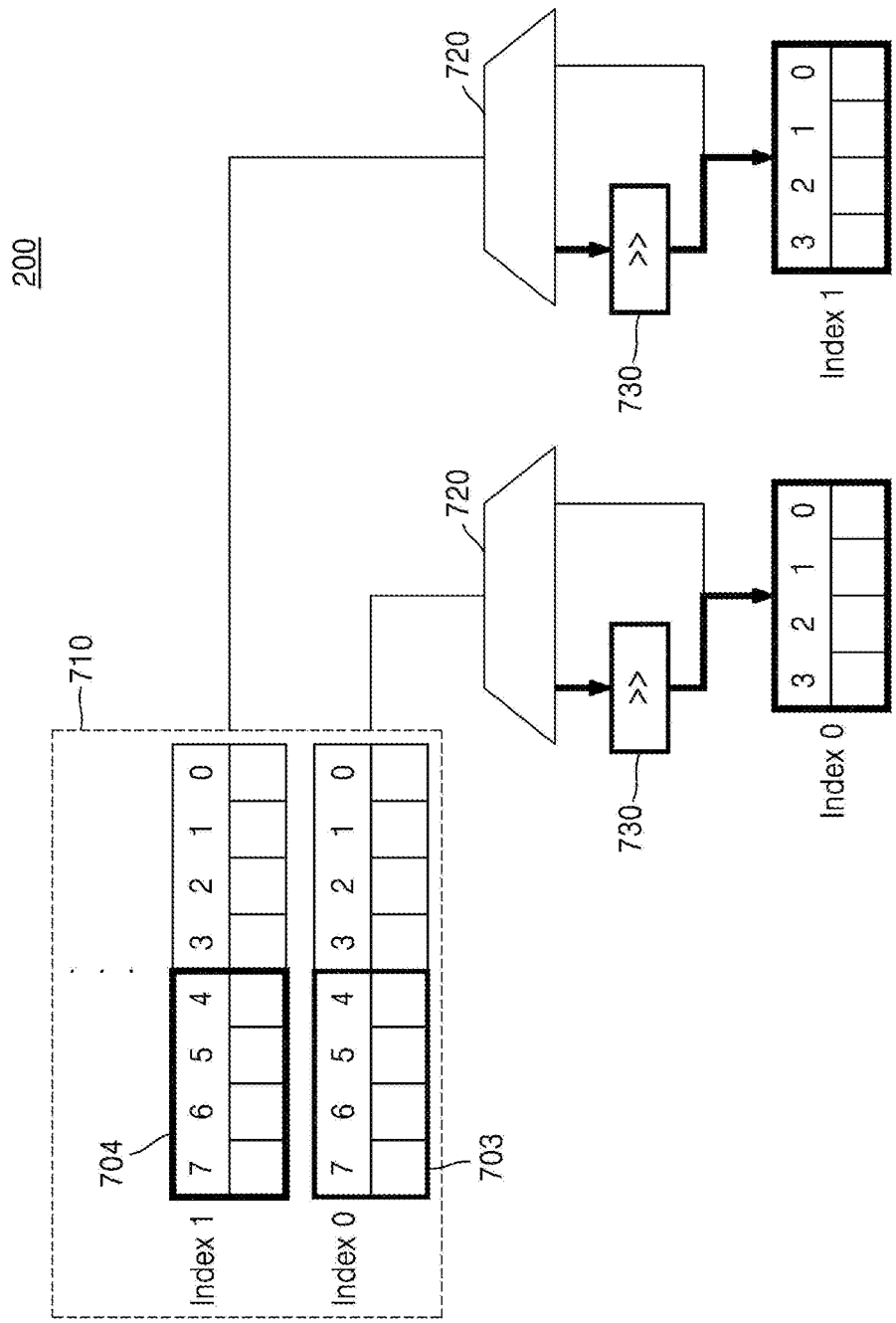

FIGS. 7 and 8 are schematic block diagrams of a preprocessing apparatus. For explanatory purposes, the preprocessing apparatus of FIGS. 7 and 8 will be discussed with reference to the preprocessing apparatus 200 of FIG. 6, noting the embodiments are not limited thereto.

Thus, as illustrated in FIG. 7, the input node data stored in an input node buffer 710 may be split and processed by a size of ½. The preprocessing apparatus 200 may fetch the input node data from the memory 100 illustrated in FIG. 6 and split and store the same in the input node buffer 710. As an example, 8-bit input node data may be fetched therefrom, split and stored by 4 bits, and then output to the calculation apparatus 300.

As illustrated in FIG. 7, when input node data of lower 4 bits 701 and 702 is output to a multiplexer 720 on an index-by-index basis, the multiplexer 720 may output 4-bit input node data to the calculation apparatus 300 on an index-by-index basis. As illustrated in FIG. 8, when input node data of upper 4 bits 703 and 704 is output to a multiplexer 720 on an index-by-index basis, a shifter 730 may shift and output 4 bits to the calculation apparatus 300.

Figure 9:
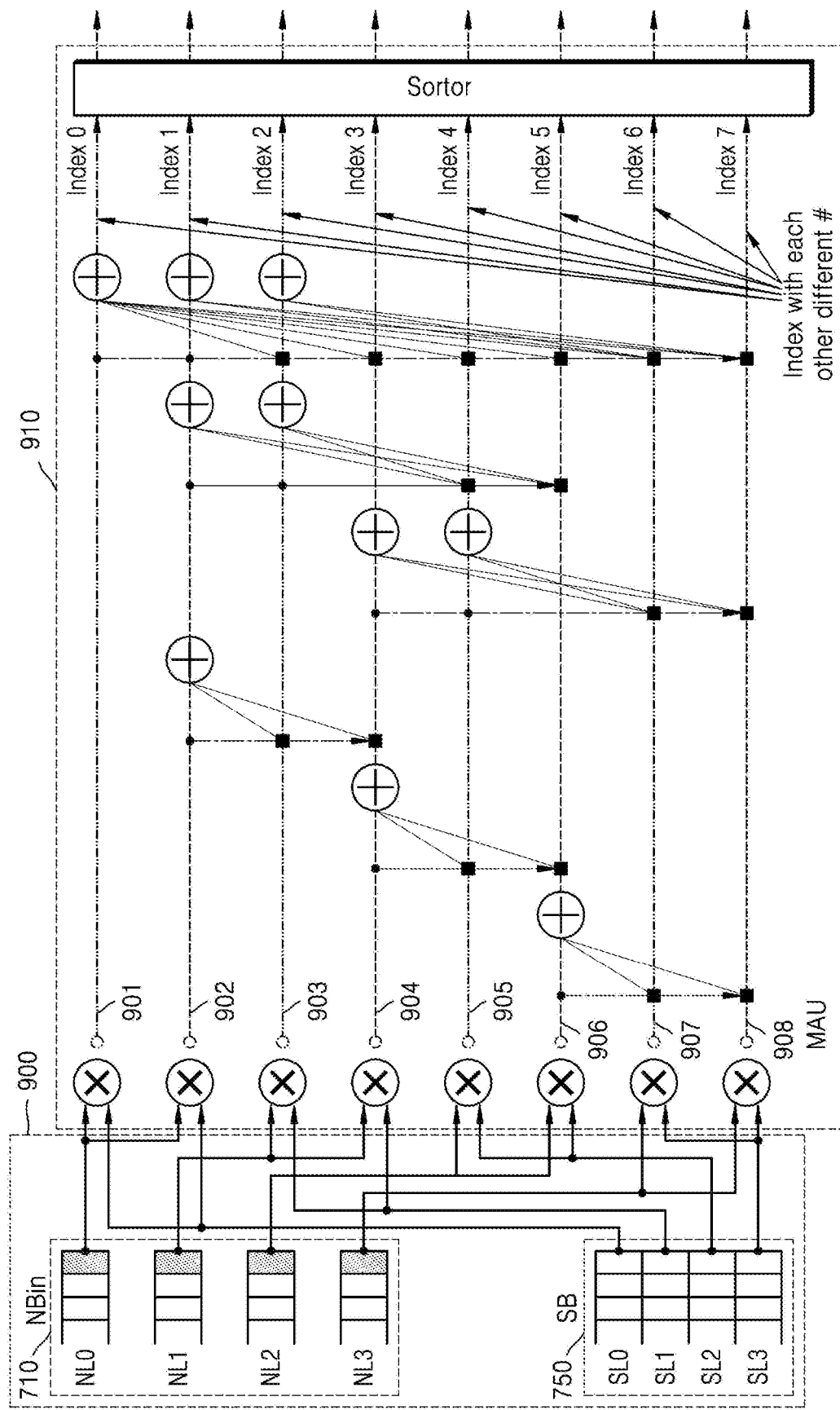
FIG. 9 is a diagram illustrating an example of a convolution operation apparatus according to an embodiment.

FIG. 9 is a diagram illustrating an example of a convolution operation apparatus. For explanatory purposes, the convolution operation apparatus of FIG. 9 will be discussed with reference to the convolution operation apparatus of FIG. 6, noting the embodiments are not limited thereto.

Thus, as illustrated in FIGS. 7 to 9, a preprocessing apparatus 900 and a calculation apparatus 910 are illustrated. The preprocessing apparatus 900 may include an input node buffer 710, a weight buffer 750, a multiplexer 720, and a shifter 730 as illustrated in FIGS. 7 and 8, and the calculation apparatus 910 may include a plurality of multipliers, a plurality of adders, a plurality of distributors, and a sorter.

The input node buffer 710 may be connected to a plurality of input node lanes NL0 to NL3 and may split and store 8-bit input node data as illustrated in FIGS. 7 and 8. The weight buffer 750 may be connected to a plurality of weight lanes SL0 to SL3 and may store 8-bit weights.

With respect to the 8-bit input node data stored in the first input node buffer connected to the first input node lane NL0, the lower 4-bit input node data 701 may be output through the multiplexer 720 to the multiplier connected to a first lane 901. Meanwhile, with respect to the 8-bit input node data stored in the first input node buffer, the upper 4-bit input node data 703 may be 4-bit-shifted by the shifter 730 and output through the multiplexer 720 to the multiplier connected to a second lane 902. The 8-bit weight output from the first weight buffer connected to the first weight lane SL0 may be output to the multiplier connected to the first lane 901 and the second lane 902. Herein, the preprocessing apparatus 900 may output the indexes of the lower 4-bit and upper 4-bit input node data of the 8-bit input node data stored in the first input node buffer as an index 0.

With respect to the 8-bit input node data stored in the second input node buffer connected to the second input node lane NL1, the lower 4-bit input node data 702 may be output through the multiplexer 720 to the multiplier connected to a third lane 903. Meanwhile, with respect to the 8-bit input node data stored in the second input node buffer, the upper 4-bit input node data 704 may be 4-bit-shifted by the shifter 730 and output through the multiplexer 720 to the multiplier connected to a fourth lane 904. The 8-bit weight output from the second weight buffer connected to the second weight lane SL1 may be output to the multiplier connected to the third lane 903 and the fourth lane 904. Herein, the preprocessing apparatus 900 may output the indexes of the lower 4-bit and upper 4-bit input node data of the 8-bit input node data stored in the second input node buffer as an index 1. The preprocessing apparatus 900 may preprocess the input node data stored in the input node buffer in the same manner and output the result thereof to the calculation apparatus 910.

The 8-bit input node data stored in the third input node buffer connected to the third input node lane NL2 and the 8-bit input node data stored in the fourth input node buffer connected to the fourth input node lane NL3 may be output to the fifth to eighth lanes through the above preprocessing process.

The calculation apparatus 910 may sum the lane values of the first to eighth lanes 901 to 908 (i.e., the products of the input node data and the weights) through the adders and output the sum thereof to the sorter. The sorter may perform summation and accumulation on an index-by-index basis. Herein, the index may indicate the position of storage in the output buffer.

The lane value of the first lane 901 and the lane value of the second lane 902 may not be compared with each other because they are of the same index 0. Thus, the lane value of the first lane 901 may not be output to the comparator or the distributor of the second lane 902, but may be output to the comparator or the distributor of the third to eighth lanes 903 to 908. The lane value of the second lane 902 may be output to the distributor of the third lane 903, the fourth lane 904, the fifth lane 905, and the sixth lane 906. In this way, the lane values of all the lanes may be convoluted through the distributors, the multiplexers, and ten adders. Herein, when the distributors have the same index, the corresponding lane value may be output to the adder and the corresponding lane value may be set to 0, and when the distributors have different indexes, '0' may be output to the adder and the lane value of the corresponding lane may be maintained. For example, as illustrated in FIG. 9, since the index 2 of the sixth lane 906 and the index 3 of the eighth lane 908 are different from each other, '0' may be output to the adder and the lane value of the eighth lane 908 may be maintained.

In this way, by splitting the 8-bit input node data by 4 bits and outputting the results to the calculation apparatus 910 in accordance with different output indexes, the number of adders of the calculation apparatus 910 may be reduced to 10. However, according to the related art, when 8-bit input node data is processed, 28 adders may be required.

Figure 10A:
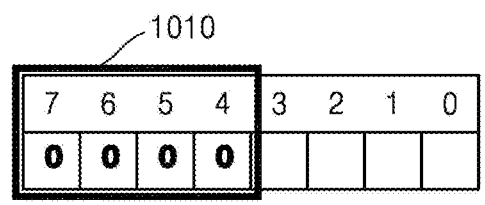
FIGS. 10A to 10C are diagrams illustrating an example of a method of processing input node data according to an embodiment.
Figure 10B:
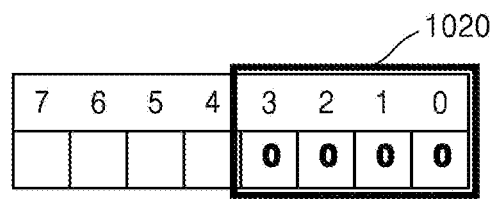
Figure 10C:
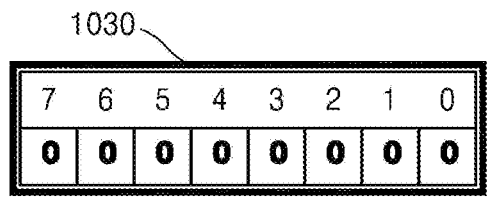

FIGS. 10A to 10C are diagrams illustrating an example of a method of processing input node data in a preprocessing apparatus. For explanatory purposes, the preprocessing apparatus of FIGS. 10A to 10C will be discussed with reference to the preprocessing apparatus 200 of FIG. 6, noting the embodiments are not limited thereto.

When '0' is filled in units of size by which the bit size of the input node data is divided, the preprocessing apparatus 200 may skip or may not fetch the data of the corresponding region from the external memory, such as the first memory 110 or the second memory 120. Thus, the skipped region may be filled with the next input node data having the same index from the external memory or the buffer region of the preprocessing apparatus 200.

As illustrated in FIG. 10A, when 8-bit input node data is divided and operated in units of 4 bits, if the input node data is a value ranging from 0 to 15, such that the input node data may be confined to the least significant bit (LSB) 4 bits, the most significant bit (MSB) 4 bits 1010 may have a value of 0 and thus may be skipped.

As illustrated in FIG. 10B, when 8-bit input node data is divided and operated in units of 4 bits, if the input node data is a value of a multiple of 16, such that the input node data may be confined to the MSB 4 bits, the LSB 4 bits 1020 may have a value of 0 and thus may be skipped.

As illustrated in FIG. 10C, when the entire 8 bits 1030 is 0, the entire 8 bits may be skipped.

Thus, in the case of splitting the input node data, the preprocessing apparatus 200 according to an embodiment may increase the MAC operation speed by skipping a partial region having a value of 0.

FIG. 11 is a flowchart illustrating a preprocessing method for a convolution operation according to another embodiment.

Thus, as illustrated in FIG. 11, in operation 1100, input node data may be split and stored by a predetermined size on an index-by-index basis in a plurality of node input buffers connected respectively to a plurality of node lanes and weights may be stored in a plurality of weight buffers connected respectively to a plurality of weight lanes. When the input node data is split, the number of MAC processing bits may be considered. For example, with respect to a MAC structure for processing 16 bits, the double efficiency may be obtained by dividing the data by 8 bits on an input node or a weight buffer, concatenating the results, and passing the results through a calculator. Herein, the predetermined size may be split by ½, ⅓, or ¼ according to the processing bits of the calculator. That is, in an example of the calculator designed with 8 bits, a 4-bit input may be split by ½ and a 3-bit input may be split by ¼.

In operation 1102, a multiplexer may output, to an operation circuit for a neural network operation, first split data of the input node data output from the node input buffer corresponding to the predetermined size.

In operation 1103, a shifter may shift and output second split data of the input node data output from the multiplexer.

The complexity of a MAC structure for a convolutional neural network may be reduced through the preprocessing method according to an embodiment.

Figure 12:
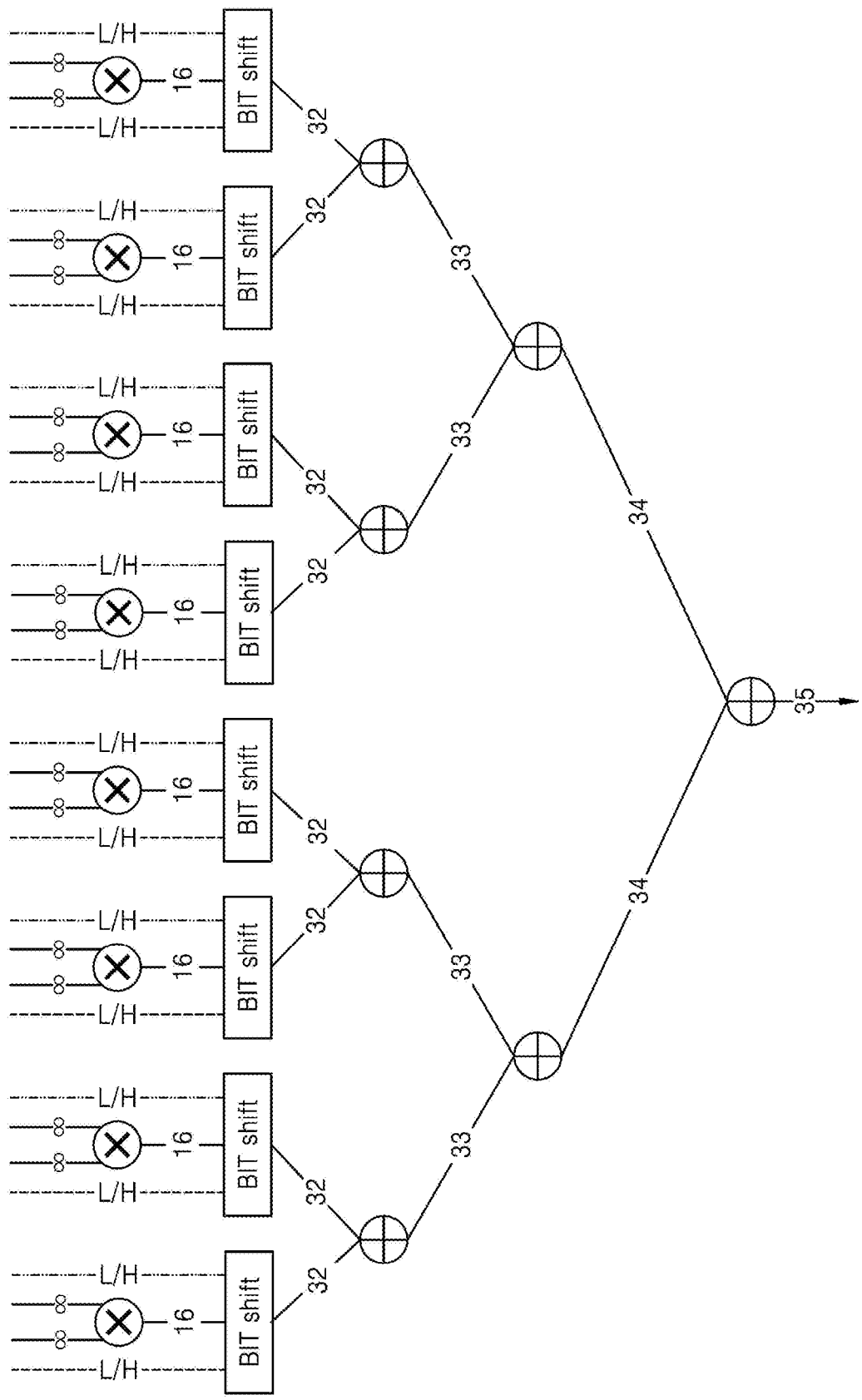
FIGS. 12 and 13 are diagrams illustrating an example of a convolution operation apparatus according to an embodiment.
Figure 13:
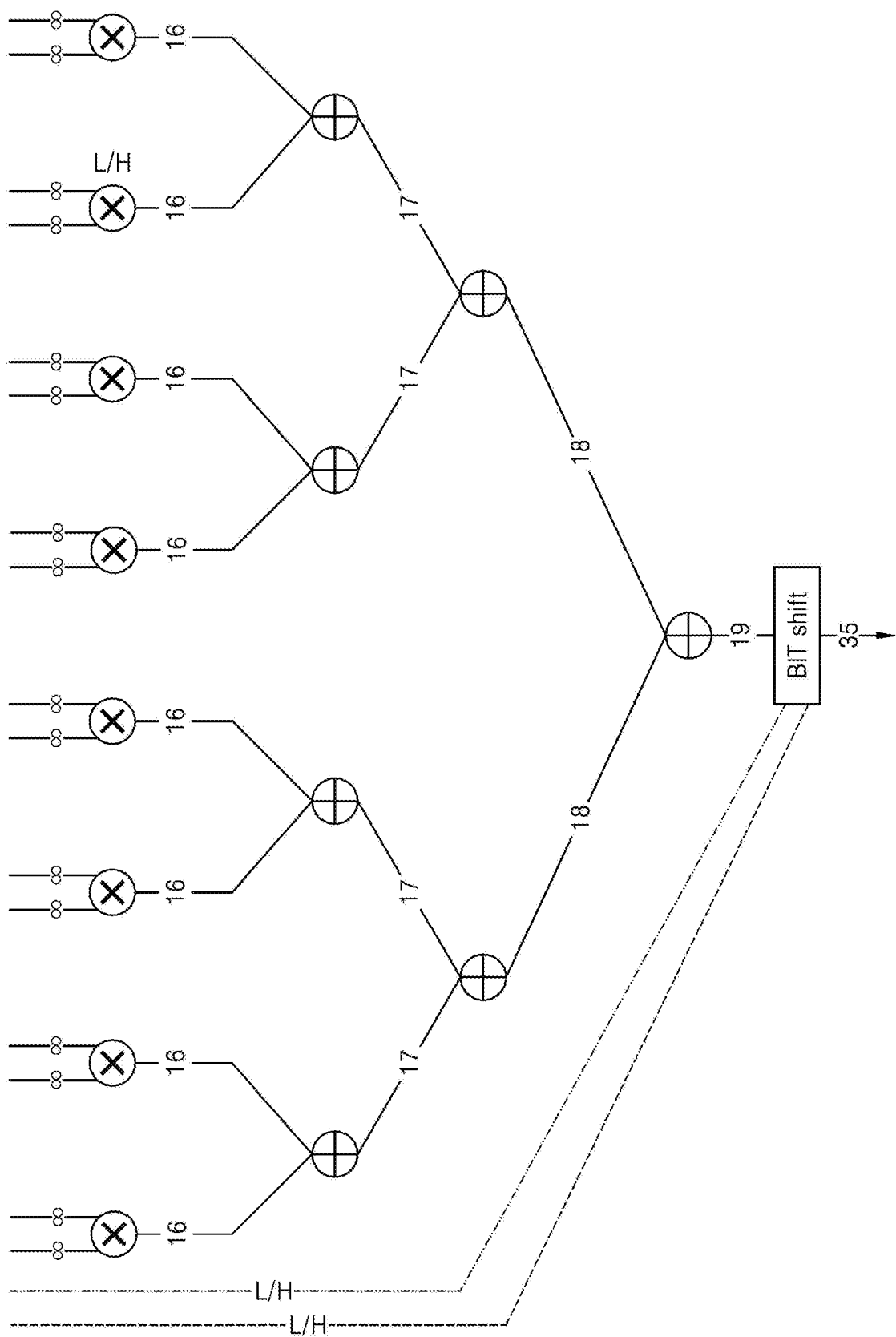

FIGS. 12 and 13 are diagrams illustrating an example of a convolution operation apparatus according to another embodiment. With reference to FIGS. 12 and 13, a description will be given of the implementation of weight reduction through preprocessing at an input stage in a multi-cycle operation. When a 16-bit operation is performed in a MAC structure capable of 8-bit input processing, four multi-cycle operations may be required. A typical convolution operation apparatus may be as illustrated in FIG. 12. As illustrated in FIG. 12, 16-bit output data obtained by multiplying 8-bit node input data by 8-bit weights may be shifted by 16 bits, and an addition operation may be performed on the 32-bit output. Thus, with respect to the typical convolution operation apparatus, since a bit shift should be performed up to 16 bits after a multiplication operation, the size of an adder on an adder tree may be increased.

Figures 14, 15:
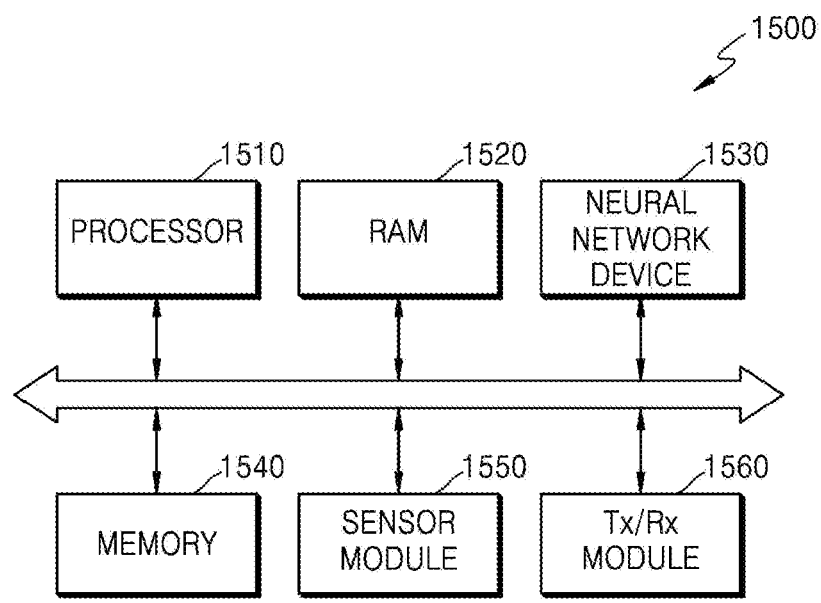
FIG. 14 is a diagram illustrating an example of symbol data about input node data and weights according to an embodiment.
FIG. 15 is a schematic block diagram illustrating an electronic system according to an embodiment.

Thus, as illustrated in FIG. 13, before the input to a MAC calculator, a preprocessing apparatus according to the present application may output data in four stages as illustrated in FIG. 14. Herein, when 8-bit input node data and weights are divided into two stages, L may be LSB 4 bits and H may be MSB 4 bits. Thus, in the preprocessing apparatus, as illustrated in FIG. 14, symbol data may be used to output the data to the MAC calculator in accordance with L or H at the input stage.

In a first cycle, the node input data of MSB 4 bits and the weight of MSB 4 bits may be output to the MAC calculator, and when the calculator outputs the convolution operation result data, it may be shifted by 16 bits.

In a second cycle, the node input data of LSB 4 bits and the weight of MSB 4 bits may be output to the MAC calculator, and when the calculator outputs the convolution operation result data, it may be shifted by 8 bits.

In a third cycle, the node input data of MSB 4 bits and the weight of LSB 4 bits may be output to the MAC calculator, and when the calculator outputs the convolution operation result data, it may be shifted by 8 bits.

In a fourth cycle, the node input data of LSB 4 bits and the weight of LSB 4 bits may be output to the MAC calculator.

Through the preprocessing apparatus according to an embodiment, an addition tree may be reduced by half in comparison with the typical MAC structure.

In the embodiment, the case of dividing the 8-bit input into two stages (H and L) has been described. However, when the 16-bit input is divided into four stages, the size of the adder may be further reduced with respect to the symbol data including H, MH, ML, and L.

FIG. 15 is a schematic block diagram illustrating an electronic system according to another embodiment.

Thus, as illustrated in FIG. 15, an electronic system 1500 may extract valid information by analyzing input data in real time based on a neural network and, based on the extracted information, perform a situation determination or control the configurations of an electronic device on which the electronic system 1500 is mounted. For example, the electronic system 1500 may be representative of, or applied to, a drone, a robotic apparatus such as an advanced driver assistance system (ADAS), a smart TV, a smart phone, a medical device, a mobile device, an image display device, a measurement device, or an IoT device, and may also be representative of, or mounted on, one or more of various other types of electronic devices.

The electronic system 1500 may include a processor 1510, a RAM 1520, a neural network device 1530, a memory 1540, a sensor module 1550, and a communication (Tx/Rx) module 1560. The electronic system 1500 may further include, for example, an input/output module, a security module, and/or a power control device. Some of the hardware configurations of the electronic system 1500 may be mounted on one or more semiconductor chips. The neural network device 1530 may be or may include a neural network dedicated hardware accelerator described above.

The processor 1510 may control an overall operation of the electronic system 1500. The processor 1510 may include a processor core or may include a plurality of processor cores (multi-core). The processor 1510 may process or execute programs and/or data stored in the memory 1540. In an embodiment, the processor 1510 may control the functions of the neural network device 1530 by executing the programs stored in the memory 1540. The processor 1510 may be implemented as a CPU, a GPU, an AP, or the like.

The RAM 1520 may temporarily store programs, data, or instructions. For example, the programs and/or data stored in the memory 1540 may be temporarily stored in the RAM 1520 according to a booting code or the control of the processor 1510. The RAM 1520 may be implemented as a memory such as a dynamic RAM (DRAM) or a static RAM (SRAM).

The neural network device 1530 may perform a neural network operation based on the received input data and may generate an information signal based on the operation performance result. The neural networks may include, but are not limited to, convolutional neural networks (CNN), recurrent neural networks (RNN), deep belief networks, and/or restricted Boltzman machines. The neural network device 1530 may be hardware for performing a process by using the neural network and may include a preprocessor for the neural network operation described above.

The information signal may include one of various types of recognition signals such as a voice recognition signal, an object recognition signal, an image recognition signal, and a biometric information recognition signal. For example, the neural network device 1530 may receive frame data included in a video stream as input data and generate a recognition signal about an object included in an image represented by the frame data from the frame data. However, the present disclosure is not limited thereto, and the neural network device 1530 may receive various types of input data depending on the type or function of an electronic device mounted with the electronic system 1500 and generate a recognition signal according to the input data.

The memory 1540 may be a storage for storing data and may store an operating system (OS), various programs, and various data. In an embodiment, the memory 1540 may store intermediate results (e.g., an output feature map) generated in the operation of the neural network device 1530 in the form of an output feature list or an output feature matrix. In an embodiment, the memory 1540 may store a compressed output feature map. Also, the memory 1540 may store quantized neural network data (e.g., parameters, a weight map, or a weight list) used in the neural network device 1530.

The memory 1540 may be a DRAM but is not limited thereto. The memory 1540 may include either one or both of volatile memories and nonvolatile memories. The nonvolatile memories may include, for example, ROMs, PROMs, EPROMs, EEPROMs, flash memories, PRAMs, MRAMs, RRAMs, and/or FRAMs. The volatile memories may include, for example, DRAMs, SRAMs, SDRAMs, PRAMs, MRAMs, RRAMs, and/or FeRAMs. In an embodiment, the memory 1540 may include any one or any combination of any two or more of of HDDs, SSDs, CF, SD, Micro-SD, Mini-SD, xD, and memory sticks.

The sensor module 1550 may collect information around an electronic device of which the electronic system 1500 is representative of, or mounted on. The sensor module 1550 may sense or receive signals (e.g., image signals, voice signal, magnetic signals, biological signals, or touch signals) from outside the electronic device and convert the sensed or received signals into data. For this purpose, the sensor module 1550 may include a sensing device, for example, one or more of various types of sensing devices such as microphones, imaging devices, image sensors, light detection and ranging (LIDAR) sensors, ultrasonic sensors, infrared sensors, biosensors, and touch sensors.

The sensor module 1550 may provide the converted data as input data to the neural network device 1530. For example, the sensor module 1550 may include an image sensor and may capture an image of the external environment of the electronic device, generate a video stream, and sequentially provide consecutive data frames of the video stream as input data to the neural network device 1530. However, the present disclosure is not limited thereto, and the sensor module 1550 may provide various types of data to the neural network device 1530.

The communication module 1560 may include various wired or wireless interfaces capable of communicating with external devices. For example, the communication module 1560 may include a communication interface capable of connecting to a wired Local Area Network (LAN), a wireless Local Area Network (WLAN) such as Wi-Fi (Wireless Fidelity), a Wireless Personal Area Network (WPAN) such as Bluetooth, a wireless Universal Serial Bus (USB), Zig-Bee, NFC (Near Field Communication), RFID (Radio-Frequency Identification), PLC (Power Line Communication), or a mobile cellular network such as 3G (3rd Generation), 4G (4th Generation), or LTE (Long Term Evolution).

In an embodiment, the communication module 1560 may receive data about the neural network from the outside.

The convolution operation apparatus 10, the first memory 110, the second memory 120, the third memory 130, the input data processor 200, the calculator 300, the post processor 400, the first to Nth input data processor units 210_1 to 210_N, the summation circuit 310, the first to Mth accumulation circuits 320_1 to 320_M, the fetcher 211, the dispatcher 212, the input node buffers, the multiplexers 720, the shifters 730, the preprocessing apparatus 900, the calculation apparatus 910, the electronic system 1500, the processor 1510, the RAM 1520, the neural network device 1530, the memory 1540, the sensor module 1550, and the communication (Tx/Rx) module 1560 in FIGS. 1-15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network apparatus, the apparatus comprising:
    a plurality of node buffers connected to a node lane and configured to store input node data by a predetermined bit size, the input node data being N bits (N is a natural number greater than or equal to 2);

a plurality of weight buffers connected to a weight lane and configured to store weights; and
one or more processors configured to:
generate first and second split data by splitting the input node data by the predetermined bit size, the first split data being least significant bit (LSB) N/2 bits of the input node data and the second split data being most significant bit (MSB) N/2 bits of the input node data,
store the first and second split data in the node buffers,
output the first split data to an operation circuit for a neural network operation on an index-by-index basis,
shift the second split data,
output the second split data to the operation circuit on the index-by-index basis,
not split and store either one or both of the first and second split data, in response to the either one or both of the first and second split data comprising all zero values, and
perform a replacement on the either one or both of the first and second split data using partial data of next input node data having a same index as an index of the input node data,
wherein the index-by-index basis comprises assigning same index to operation results of the operation circuit with regard to first split data and second split data split from same input node data, and
wherein the operation circuit is configured to perform an accumulation sum operation based on the index.

2. The apparatus of claim 1, wherein the operation circuit is configured to respectively convolute the first split data and the shifted second split data based on the weights.

3. The apparatus of claim 1, wherein the one or more processor further comprise:
a multiplexer configured to perform the outputting of the first split data to the operation circuit for the neural network operation on the index-by-index basis; and
a shifter configured to perform the shifting of the second split data, and perform the outputting of the second split data to the operation circuit on the index-by-index basis.

4. The apparatus of claim 1, wherein the one or more processors are configured to not split and store the input node data except for the LSB N/2 bits, in response to N/2 being 4 and the input node data having a value of 0 to 15.

5. The apparatus of claim 1, wherein the one or more processors are configured to not split and store the LSB N/2 bits of the input node data, in response to the input node data having a value of a multiple of 16.

6. The apparatus of claim 1, wherein the one or more processors are configured to not split and store the input node data, in response to the input node data having a total value of 0.

7. The apparatus of claim 1, wherein the one or more processors are configured to not fetch a region of the input node data including a zero value from a memory, in response to the zero value being included in units of size by which a bit size of the input node data is divided.

8. A neural network apparatus, the apparatus comprising:
a plurality of node buffers connected to a node lane and configured to store input node data by a predetermined bit size, the input node data being N bits (N is a natural number greater than or equal to 2);
a plurality of weight buffers connected to a weight lane and configured to store weights; and
one or more processors configured to:
generate first and second split data by splitting the input node data by the predetermined bit size, the first split data being least significant bit (LSB) N/2 bits of the input node data and the second split data being most significant bit (MSB) N/2 bits of the input node data;
store the first and second split data in the node buffers,
output the weights from the weight buffers,
output the first split data from the node buffers on an index-by-index basis, and
shift and output the second split data from the node buffers on an index-by-index basis;
an operation circuit configured to convolute the first split data and the shifted second split data output from the node buffers and the weights output from the weight buffers;
not split and store either one or both of the first and second split data, in response to the either one or both of the first and second split data comprising all zero values; and
perform a replacement on the either one or both of the first and second split data using partial data of next input node data having a same index as an index of the input node data,
wherein the index-by-index basis comprises assigning same index to operation results of the operation circuit with regard to first split data and second split data split from same input node data, and
wherein the operation circuit is configured to perform an accumulation sum operation based on the index.

9. The apparatus of claim 8, wherein the one or more processor further comprise:
a multiplexer configured to perform the outputting of the first split data from the node buffers on the index-by-index basis; and
a shifter configured to perform the shifting and outputting of the second split data from the node buffers on the index-by-index basis.

10. A neural network apparatus, the apparatus comprising:
a preprocessing apparatus configured to split input node data and weights by a predetermined size of at least two or more, store the split input node data and the split weights by the predetermined size, and output the split input node data and the split weights based on symbol data, the input node data being N bits (N is a natural number greater than or equal to 2), the split input node data comprising most significant bit (MSB) N/2 bits data of the input node data and least significant bit (LSB) N/2 bits data of the input node data, the split weights comprising MSB N/2 bits data of the weights and LSB N/2 bits data of the weights;
an operation circuit configured to generate output data by performing a convolution operation on the split input node data and the split weights, and output the generated output data; and
a shifter configured to shift the generated output data output from the operation circuit,
wherein the preprocessing apparatus is configured to not split and store the split input node data, in response to the split input node data comprising all zero values, and
wherein the preprocessing apparatus is configured to perform a replacement on the split input node data using partial data of next input node data having a same index as an index of the input node data,
wherein the preprocessing apparatus is configured to assign same index to operation results of the operation circuit with regard to the split input node data split from same input node data, and wherein the operation circuit is configured to perform an accumulation sum operation based on the index.

11. The neural network operation apparatus of claim 10, wherein the preprocessing apparatus is configured to:
split the input node data into at least first and second input node data, and split the weights into at least a first and second weight;
output the first input node data and the first weight based on the symbol data in a first cycle operation;
output the second input node data and the first weight based on the symbol data in a second cycle operation;
output the first input node data and the second weight based on the symbol data in a third cycle operation;
output the second input node data and the second weight based on the symbol data in a fourth cycle operation; and
wherein the shifter is configured to:
shift the first input node data and the first weight output in the first cycle operation by twice the predetermined size;
shift the second input node data and the first weight output in the second cycle operation by the predetermined size; and
shift the first input node data and the second weight output in the third cycle operation by the predetermined size.

12. A method for neural network operation, the method comprising:
splitting and storing input node data into first and second split data and storing the first and second split data by a predetermined size on an index-by-index basis in a plurality of node input buffers connected respectively to a plurality of node lanes, the input node data being N bits (N is a natural number greater than or equal to 2), the first split data being least significant bit (LSB) N/2 bits of the input node data and the second split data being most significant bit (MSB) N/2 bits of the input node data;
storing weights in a plurality of weight buffers connected respectively to a plurality of weight lanes;
outputting, by a multiplexer to an operation circuit for the neural network operation, the first split data;
shifting and outputting, by a shifter to the operation circuit, the second split data;
not splitting and storing either one or both of the first and second split data, in response to the either one or both of the first and second split data comprising all zero values; and
performing a replacement on the either one or both of the first and second split data using partial data of next input node data having a same index as an index of the input node data,
wherein the index-by-index basis comprises assigning same index to operation results of the operation circuit with regard to first split data and second split data split from same input node data, and
wherein the operation circuit is configured to perform an accumulation sum operation based on the index.

13. The method of claim 12, further comprising not splitting and storing the input node data except for the LSB N/2 bits, in response to N/2 being 4 and the input node data having a value of 0 to 15.

14. The method of claim 12, further comprising not splitting and storing the LSB N/2 bits of the input node data, in response to the input node data having a value of a multiple of 16.

15. The method of claim 12, further comprising not splitting and storing the input node data, in response to the input node data having a total value of 0.

16. The method of claim 12, wherein, further comprising not fetching a region of the input node data including a zero value from a memory, in response to the zero value being included in units of size by which a bit size of the input node data is divided.

* * * * *